United States Patent
Van Den Abbeele et al.

(10) Patent No.: US 7,812,089 B2
(45) Date of Patent: Oct. 12, 2010

(54) AQUEOUS POLYMER DISPERSION, PREPARATION AND USE THEREOF

(75) Inventors: Henk Jan Frans Van Den Abbeele, Diest (BE); Joseph Petronella Friederichs, Wessem (NL); Hendrik Jan Gerrit Luttikhedde, Raisio (FI)

(73) Assignees: Topchim NV, Wommelgem (BE); DSM New Business Development B.V., El Urmond (NL)

( * ) Notice: Subject to any disclaimer, the term of this patent is extended or adjusted under 35 U.S.C. 154(b) by 0 days.

(21) Appl. No.: 12/213,456

(22) Filed: Jun. 19, 2008

(65) Prior Publication Data

US 2009/0018257 A1    Jan. 15, 2009

Related U.S. Application Data

(63) Continuation of application No. 10/528,760, filed as application No. PCT/FI03/00731 on Oct. 6, 2003, now abandoned.

(30) Foreign Application Priority Data

| Oct. 4, 2002 | (EP) | 02079173 |
| Oct. 18, 2002 | (EP) | 02079406 |
| Mar. 4, 2003 | (EP) | 03075632 |
| Apr. 15, 2003 | (EP) | 03447092 |

(51) Int. Cl.
    *C08L 37/00*   (2006.01)
(52) U.S. Cl. .................. 524/811; 524/549
(58) Field of Classification Search ........... 524/811
    See application file for complete search history.

(56) References Cited

U.S. PATENT DOCUMENTS

| 2,565,147 A | 8/1951 | Pfluger |
| 2,944,033 A | 7/1960 | Solomon |
| 3,444,151 A * | 5/1969 | Gonzalez et al. ........... 526/203 |
| 3,494,979 A | 2/1970 | Pratt |
| 3,509,110 A | 4/1970 | Giulio et al. |
| 3,857,803 A | 12/1974 | Shenfeld et al. |
| 3,998,907 A | 12/1976 | DiGiulio |
| 4,040,900 A * | 8/1977 | Mazzarella et al. ........ 162/158 |
| 4,221,697 A * | 9/1980 | Osborn et al. .............. 524/853 |
| 4,243,564 A | 1/1981 | Mavis |
| 4,440,884 A | 4/1984 | Jannusch |
| 4,588,786 A | 5/1986 | Kadono et al. |
| 4,623,578 A * | 11/1986 | Marchetti et al. ........... 428/209 |
| 5,565,537 A * | 10/1996 | Uda et al. .................... 526/262 |
| 5,759,249 A * | 6/1998 | Wasser .................... 106/209.1 |
| 5,994,468 A | 11/1999 | Wang et al. |
| 6,048,930 A | 4/2000 | Wang et al. |
| 6,051,107 A * | 4/2000 | Varnell ....................... 439/607 |
| 6,054,532 A | 4/2000 | Wang et al. |
| 6,232,405 B1 | 5/2001 | Schmidhauser et al. |
| 6,401,776 B1 | 6/2002 | Wang et al. |
| 6,407,197 B1 | 6/2002 | Van Den Berg et al. |
| 7,323,505 B2 * | 1/2008 | Thibaut ...................... 524/291 |
| 2001/0034393 A1 | 10/2001 | Wang et al. |
| 2003/0091527 A1 | 5/2003 | Wang et al. |
| 2004/0024135 A1 * | 2/2004 | Verge et al. ............... 525/327.6 |
| 2004/0054037 A1 | 3/2004 | Abbeele Van Den et al. |
| 2004/0065425 A1 * | 4/2004 | Irwin et al. ............... 162/168.1 |
| 2004/0068045 A1 * | 4/2004 | Betremieux et al. ........ 524/556 |
| 2005/0027035 A1 | 2/2005 | Wang et al. |

FOREIGN PATENT DOCUMENTS

| DE | 1720746 | 7/1971 |
| DE | 4342157 | 6/1995 |
| WO | 99/45039 | 9/1999 |

OTHER PUBLICATIONS

International Search Report mailed Feb. 10, 2004 in International (PCT) Application No. PCT/FI2003/000731.
Derwent Abstract for 1968-27823Q for DE 1720746 (1976).

\* cited by examiner

*Primary Examiner*—Randy Gulakowski
*Assistant Examiner*—Robert Loewe
(74) *Attorney, Agent, or Firm*—Wenderoth, Lind & Ponack, L.L.P.

(57) ABSTRACT

The present invention relates to an aqueous polymer dispersion comprising a copolymer of anhydride monomer units and vinyl monomer units, which copolymer has been subjected to an imidization reaction. The present invention further relates to a method for the production and use of such a dispersion.

14 Claims, No Drawings

AQUEOUS POLYMER DISPERSION, PREPARATION AND USE THEREOF

This application is a Continuation Application of U.S. Ser. No. 10/528,760, filed Mar. 22, 2005 now abandoned, which is a 371 Application of PCT/FI03/00731, filed Oct. 6, 2003.

The present invention relates to an aqueous polymer dispersion comprising a copolymer of anhydride monomer units and vinyl monomer units, which copolymer has been subjected to an imidization reaction. The present invention further relates to a method for the production and use of such dispersion.

From EP-A-1060197 a method is known for the production of an aqueous dispersion of a styrene maleic anhydride copolymer (abbreviated generally as SMA) which is partly imidized resulting in a poly(styrene-co-maleimide) [SMI] dispersion, to be used as a paper sizing composition. The dispersion is applied in a top coat to a paper surface, with the aim of reducing the water-absorption properties of the paper surface and of providing good ink-jet printing properties. According to EP-A-1060197, the copolymer is synthesised using generally known processes. The copolymer is subjected to an imidization reaction, by contacting it with an aqueous solution of $NH_3$ or an amine ($RNH_2$), at a temperature of at least 95° C. and a pressure which is chosen such as to avoid boiling of the reaction mixture. The molar ratio of maleic anhydride monomer units and $NH_3$ or amine is selected between 1:0.8 and 1:5. The imidization reaction is continued until a degree of imidization of the maleic anhydride monomer units is obtained of at most 75%. Thereafter, the dispersion is applied in a top coat to the paper and the paper is dried and calendared. It has, however, been found that when printing a paper with the aqueous copolymer dispersion in the top coat disclosed in EP-A-1060197, the quality of the printing is insufficient. In particular, characters are printed insufficiently sharp; the delimitation of different colours is insufficient as a consequence of which colours fade into each other.

EP-A-1060197 also includes a comparative example of a polymer dispersion prepared according to DE-A-1720746. DE-A-1720746 describes an aqueous dispersion of a polymer obtained by subjecting an SMA containing about equal molar amounts of maleic anhydride and styrene to an imidization reaction in an aqueous solution of $NH_3$ at a temperature above 120° C. The degree of imidization in the examples is not revealed. In the comparative example of EP-A-1060197 made according to DE-A-1720746, the SMA is 89% imidized. It has been observed that this dispersion has a very wide particle size distribution and forms an unstable dispersion, forming a sediment already after standing for a short period.

There is thus a need for a new polymer dispersion composition with which an improved printing quality may be achieved.

There is further a need for a process of producing such an polymer dispersion composition.

Therefore, the present invention aims at providing an aqueous polymer dispersion composition for use in a top coat for paper, with which an improved printing of the paper may be achieved.

This aim is achieved with the present invention, with the technical features of the characterising part of the independent claims.

The aqueous polymer dispersion of this invention comprises a copolymer of anhydride monomer units and vinyl monomer units, of which copolymer at least 90% of the moles of the anhydride monomer units are imidized. This polymer dispersion contains SMI in the form of discrete particles which can be called organic pigment.

Suitable anhydride monomers for use in the copolymer are, for example, $\alpha$-$\beta$-unsaturated dicarboxylic anhydrides such as maleic anhydride, fumaric anhydride, citraconic anhydride, itaconic anhydride and mixtures thereof. Preferably the copolymer contains maleic anhydride monomer units.

Suitable vinyl monomers for use in the copolymer include vinyl aromatic monomers (such as styrene, $\alpha$-methyl styrene, vinyl toluene and indene), mono-olefinic unsaturated hydrocarbons (such as ethylene, propylene and isobutylene), $\alpha$-$\beta$-unsaturated carboxylic esters (such as acrylate esters (like ethylacrylate, butylacrylate and 2-ethylhexylacrylate), methacrylate esters (like methylmethacrylate, ethylmethacrylate and 2-hydroxyethylmethacrylate) and maleate diesters (like dioctylmaleate)), halogenated olefins (such as vinyl chloride and vinylidene chloride) and mixtures thereof. Preferably the copolymer contains readily commercially available styrene or $\alpha$-methyl styrene, although the presence of styrene monomer units is most preferred.

It has been surprisingly found that when using a polymer dispersion in which at least 90 mole % of the anhydride monomer units have been imidized, a coating composition is obtained which, when applied in a coating to a surface, gives an improved coating. It has been found that if the imidization degree of the copolymer is at least 90%, the particles have a glass transition temperature (Tg) of at least 160° C. and an improved mechanical strength. As a result of the improved mechanical strength the particles are capable of withstanding deformation forces occurring in the course of the calendaring process used after applying the coating to the paper surface. When applying the polymer dispersion of this invention to a paper surface, a coating is obtained which consists of a plurality of small, discrete pigment particles showing good adhesion to each other and to the surface to be coated. It has further been found that upon printing a paper surface that has been coated with the aqueous polymer dispersion of this invention, an improved printing quality may be achieved: the characters being well delimited from each other, superimposed successively applied printing layers being well delimited from each other, fading of adjacent characters and colours into each other being limited.

The observation of the improved printing quality is attributed to the fact that the coating is built up of a plurality of discrete particles, drainage channels being formed between the particles, the presence of these drainage channels taking care of fast removal of ink solvent. When analysing the problems occurring with the state of the art coatings, it has been observed that application of the coating has the effect that in the course of the calendaring the partially imidized SMI copolymer particles disintegrate, flow together and form a film. Film formation has the effect that upon printing, the removal of solvent or dispersing agent for the ink is retarded and the printing quality is adversely affected. The organic pigment dispersion coating of the present invention to the contrary shows no tendency to film formation when applied in a coating, or during calendaring.

Preferably use is made of a copolymer in which the anhydride monomer content ranges between 5-50 mole %, more preferably between 5 and 43 mole %, even more preferably between 5-36 mole % and most preferably 5-29 mole %, because of the end product properties.

The anhydride monomer content of 15-29 mole % is particularly preferred, as in this range the copolymer shows suitable water solubility, giving optimum imidization yield and high solid content of the final dispersion. It has been surprisingly found that the anhydride monomer content further determines the particle size, the particle size increasing with increasing anhydride monomer content, as well as the hardness of the copolymer. The properties of the copolymer particles after imidization are determined not only by the composition of the starting material, but also by the physical conditions prevailing in the imidization reaction, e.g. concentration and agitation.

The vinyl monomer content of the copolymer ranges between 95-50 mole %, preferably between 95-81 mole %.

The aqueous polymer dispersion of this invention preferably has a solid content of more than 20 wt. %, more than 30 wt. % or even more than 40 wt. %. The dispersion comprises discrete particles having a particle diameter above 30 nm, sometimes above 40 or 50 nm, but smaller than 400 nm, often smaller than 250 or even 120 nm, the particle size distribution being narrow. As the diameter of the particles is smaller than the wavelength of visible light, a smooth, high gloss and transparent coating may be obtained. By controlling the particle size, preference may be given to a coating with a higher or lower gloss, being more transparent or showing some opaqueness. The formation of small particles further entails the advantage that stabilisation of the dispersion can be dispensed with. This is in contrast to a dispersion containing larger particles which needs the presence of an emulsifier to attain a stable dispersion.

The present invention also relates to a process for the production of the above described aqueous polymer dispersion. According to this process an aqueous polymer dispersion is prepared by 1) reacting a starting copolymer of anhydride monomer units (preferably maleic anhydride) and vinyl monomer units (preferably styrene) with an aqueous solution of $NH_3$ or an amine ($RNH_2$),
2) subjecting the thus obtained reaction mixture to an imidization reaction until at least 90 mole % of the anhydride monomer units have been imidized.

To obtain a dispersion the particles of which have a Tg that is as high as possible, the imidization reaction is preferably continued until at least 95 mole %, or even virtually all anhydride monomer units have been imidized.

A copolymer containing vinyl monomer units and anhydride monomer units may be synthesised according to processes well known to the man skilled in the art, such as for example the process described in Hanson and Zimmerman, Ind. Eng. Chem. Vol. 49, nr. 11 (1957), p. 1803-1807.

In the method of this invention, the copolymer is reacted in water, an emulsifier optionally being present. To this mixture an aqueous solution of $NH_3$ or an amine $RNH_2$ is added, in which R may be an alkyl group having between 1-18 carbon atoms or an aryl group. It is however preferred to use $NH_3$, although butylamine and stearylamine also appear to be suitable imidization reactants.

It is preferred to keep the excess of $NH_3$ or $RNH_2$ in the course of the imidization reaction as low as possible. To minimise the unnecessary loss of chemicals it is preferred that the molar ratio between the amine or $NH_3$ and the anhydride monomer in the copolymer to be imidized ranges between 0.8:1 and 1.2:1, but is preferably an equimolar ratio or slightly less. In the latter case, complete conversion of the reaction gives an odourless dispersion as all amine or $NH_3$ is consumed.

However, it is technically possible to choose the amount of $NH_3$ or $RNH_2$ such that the upper limit of the molar ratio of ($NH_3$ or $RNH_2$):(anhydride monomer present in the copolymer to be subjected to imidization) is 10:1. The lower limit may be 0.5:1. Of course it is technically feasible to keep the ratio close to equimolar ratio.

If so desired, the imidization reaction may be carried out in the presence of an alkali salt of an acid functional polymer containing acid functional monomer units and vinyl aromatic monomer units. For example alkali salt of styrene maleic anhydride copolymer may be used, which preferably has molecular mass of from 500 to 10000 g/mol and with maleic anhydride content of at least 30 mole %. The alkali salt may function as an emulsifying agent.

The anhydride monomer/vinyl monomer copolymer has a molecular weight which preferably is not too high and neither too low so as to allow obtaining a dispersion with a sufficiently high solid content. In the present invention, the anhydride monomer/vinyl monomer copolymer has a molecular weight which is at least 1000 g/mole, preferably at least 10000 g/mole, more preferably at least 60000 g/mole. The molecular weight of this copolymer is preferably less than 500000, more preferably less than 200000 g/mole or less than 150000 g/mole. Ideally, the molecular weight of the starting copolymer is between approximately 50000 and 80000 g/mole as it allows obtaining s-called monodisperse dispersion with a narrow particle size distribution of between 50 and 100 nm, the mean particle diameter being approximately 70 nm. Ultimately such dispersion allows obtaining a coating with an optimum gloss.

If so desired, the anhydride monomer/vinyl aromatic monomer copolymer used may be a copolymer composition comprising a plurality of copolymers having varying molecular weights. This function may be fulfilled by the emulsifier. The molecular weight of the copolymer after imidization has been found to be a key parameter when processing it.

A too high molecular weight of the copolymer involves the risk that the viscosity of the dispersion becomes too high and the solid content too low. A too low molecular weight of the copolymer involves the risk that the solid content of the dispersion gets too high, which has an adverse effect on the applicability of the dispersion. A too low molecular weight of the copolymer involves the additional risk to intra-particle adhesion and agglomeration, due to Van der Waals attraction between the particles, involving entanglement and the formation of particles with too large dimensions.

In the method of this invention, the imidization reaction will mostly be carried out at a temperature above 100° C., preferably between 120-195° C., more preferably at a temperature between 130-180° C., or even 150-175° C. Below 100° C. insufficient imidization has been observed. At a temperature above 170° C. and in particular above 195° C., there is an increasing risk to agglomeration of the polymer, as a consequence of which particle formation in the dispersion is counteracted, giving particles with a too large size which are visible when applied as a coating and easily involve film formation. Within the claimed temperature ranges, the imidization reaction is favoured over the formation of an imine-amine compound. The temperature range of 130-180° C. is preferred as within this range a well-defined dispersion with respect to Tg and mechanical properties and composition is obtained and the process showing good reproducibility.

Also, within the claimed temperature ranges sufficient imidization can be obtained within an economically feasible reaction time, at a pressure which is not too high, e.g. approximately 7 bar. The risk to formation of imine-amine compounds should be minimised as these compounds have a lower glass transition temperature (Tg), thus giving rise to particles that are liable to film-formation in the course of a calendaring process.

To minimise adhesion of the reaction mixture to the reactor wall in the course of the imidization reaction, the reaction mixture is stirred. It has namely been found that after the aqueous solution of the copolymer has been contacted with ammonia or the amine, in the course of the imidization reaction a gel phase is formed, which may be broken or cut through stirring, adhesion to the reactor wall thereby being minimised. This cutting action assists in shaping the particles of the dispersion formed following imidization.

The rotation speed applied upon stirring of the reaction mixture and the time during which the reaction mixture is stirred, will be in general adapted by the man skilled in the art. Adapting this parameter allow controlling the physical properties and particle size of the dispersion obtained, i.e. allows controlling whether small particles with a smooth surface are formed which ultimately give a coating with a high gloss and good transparency, or larger particles if a more opaque coating is aimed at. Stirring assists in avoiding the formation of particles with a rough surface and non-uniform shape which, when applied as a coating would give undesired scattering. It has been observed that the more uniform the shape of the particles, the better the gloss of the coating and the better the drainage properties of the coating when imprinted. The shape of the particles is determined by forces prevailing in the course of the imidization reaction, and e.g. by the time the reaction mixture is stirred.

If so required, the imidization reaction may be carried out in the presence of an anti-foaming agent and/or an emulsifier. Suitable emulsifiers may be anionic or nonionic surfactants.

With the above described production process, an aqueous dispersion of the imidized organic pigment may be obtained with the above-described solid content and particle size.

If desired, the solid content of the dispersion may be increased by methods known by man skilled in the art, especially suitable are evaporation and ultra filtration.

When applied to a surface on top of one or more already existing coatings, due to their small size, the particles of the dispersion of this invention are capable of filling gaps left in the already applied coating. In that way a surface may be obtained which is covered by an optimum coating, providing optimum drainage properties that are hardly disturbed by the underlying coatings.

As the size of the individual particles is relatively small, a dense packing of the particles is obtained when the dispersion is applied to a surface to be coated, and dried. The small size of the particles facilitates solvent release and drying of the coating, thus minimising the risk to crack formation upon drying of the coating and improving drying time of the coating. The formation of small pigment particles further has the advantage that inter-particle attraction is governed by Van der Waals forces, giving strong inter-particle adhesion and good adhesion to the surface to be coated. Due to the dense packing, a closed top coating is achieved which when imprinted shows good drainage properties thus providing quick drying of the ink, even after for example a coated paper has been subjected to a calendaring process. This is attributed to the formation of drainage channels upon drying of the coating. The dense coating assists in minimising penetration of ink particles to underlying coatings, as a consequence of which the sharpness and fineness with which the coated material is imprinted, thus the over-all printing quality, is improved as compared to prior art coatings. Furthermore, tearing of paper coated with the coating composition of this invention and the occurrence of wet pick is decreased.

It has been further found that with the method of this invention, the imidized pigment particles obtained are microporous. As the dimensions of the micropores are small, penetration of ink particles into the pigment particles is inhibited, as a consequence of which the printing quality of a surface coated with a coating containing the dispersion of this invention, is further improved.

The present invention further relates to a coating composition for a surface to be coated, the coating composition comprising an amount of the aqueous dispersion of this invention. The amount of organic pigment incorporated may vary within wide ranges and will mostly be determined by the application. In case of cheap paper applications, low amounts of organic pigments will be used so as to obtain a low density coating. When using a dispersion with a high concentration of organic pigment, either a more dense coating may be obtained, or the amount of dispersion used may be decreased.

The coating composition may further comprise the usual ingredients, such as binders (starch, latex, polyvinylalcohol, etc) and conventional pigments (kaolin, PCC, GCC, talc, silica, etc), which may be partly substituted by the polymer dispersion of this invention if so desired. The coating composition may further contain thickening agents. Hyperbranched polyesteramides such as those disclosed in U.S. Pat. No. 6,392,006 may be added to control the viscosity of the coating composition.

It has been found that the aqueous polymer dispersion of the present invention is a suitable coating material for a wide variety of surfaces that are to be imprinted. For example, the aqueous dispersion of this invention appears suitable for coating paper, paperboard, cardboard, an organic film (for example a polyethylene film), a metal foil, a textile sheet, etc. When coated with a coating comprising the aqueous polymer dispersion of this invention, an increased gloss of coated paper of 5-10 points after calendaring has been observed. This gloss improvement may be further increased by using a coating which exclusively consists of the dispersion of this invention.

The extent to which the anhydride monomer/vinyl monomer copolymer has been imidized determines the acidity of the imidized copolymer. Controlling the pH allows controlling foam formation in the course of the coating process. This is an advantage as compared to known coating compositions as they often contain calcium carbonate showing superfluous foaming. The pH further determines the area in which the dispersion of this invention may be applied. The dispersion of this invention has been found to have a pH close to 7.

EXAMPLES

Characterisation Methods

PCS Measurements

The average hydrodynamic radius of the particles of the dispersion after imidization was determined using Photon Correlation Spectroscopy. Measurements were carried out using an ALV Laser of the Vertriebsgesellschaft mbH, Langen, Germany.

Solid Content.

The solid content was determined using an infrared instrument, type Mettler LP16/PM600.

pH Measurements.

The pH value of each sample was measured with a Knick 752 Cl, nr. 051489 pH measurement instrument.

Determining the Degree of Imidization.

The degree of imidization may for example be determined with Raman FTIR spectroscopy, by correlating the absorption intensity to the intensity of the absorption at the same wavelength of a completely imidized and a non-imidized reference sample. Before carrying out any calculations, the Raman- FTIR signals were normalised based on the absorption signals originating from the aromatic rings in the polymer chains. The calculations were based on the following absorptions:

C=O imide absorption band, relatively intense signal at approximately 1768 cm$^{-1}$ C=O anhydride absorption band, at approximately 1860 cm$^{-1}$ C=O relatively weak absorption band of carboxylic acid groups, at approximately 1715 cm$^{-1}$ As a reference use was made of (1) an aqueous ammonia solution of an imide free polymer, prepared starting from 26 mole % of maleic anhydride (MA) and 74 mole % of styrene, a NH$_3$:maleic anhydride ratio of 3:1, at 50° C.; (2) a SMA powder that had been subjected to an imidization reaction by mixing 2 g of SMA (28 wt. % of MA, 72 wt. % of styrene; molecular weight 110000 g/mole) with 0.50 g of ureum in a double vice mini extruder, at 240° C. for 5 minutes at a rotation speed of 100 rpm.

Contact Angle Measurements

Contact angles were measured with a contact angle meter type Digidrop, GBX, Roman, France.

Example 1

140 g ground SMA and water were charged into a double walled, oil heated reactor of 1 l, which contained a stirrer. The SMA had a MA content of 26 mole % and a molecular weight of 80000 g/mole. To this solution a 25% NH$_3$ solution was added, so that the MA:NH$_3$ ratio was 1:1. Furthermore, a potassium salt of a SMA polymer was added having a molecular weight of 1000 g/mole and a MA content of 48 mole %. The K salt:SMA ratio was 0.03:1. Water was added until a total volume of 700 ml was obtained. The pressure was adjusted to 0.2 MPa with nitrogen. Following increasing the temperature to 160° C., at a rotation speed of 800 rpm, the pressure raised to 0.8 MPa. After 6 hours of reaction time a polymer dispersion was obtained having a solid content of approximately 20 wt. %, the particle size being between 80 and 120 nm. The MA had been completely converted to imide. The Tg of the polymer after completion of the imidization was found to be between 190 and 200° C. The dispersion had a pH of 6.8. The contact angle of the dispersion when applied to paper was found to be smaller than 40°.

Example 2

140 g ground SMA and water were charged into a double walled, oil heated reactor of 1 l, which contained a stirrer. The SMA had a MA content of 26 mole % and a molecular weight of 80000 g/mole. To this solution a 25% NH$_3$ solution was added, so that the MA:NH$_3$ ratio was 1:1. Water was added until a total volume of 700 ml was obtained. The pressure was adjusted to 0.2 MPa with nitrogen. Following increasing the temperature to 160° C., at a rotation speed of 800 rpm, the pressure raised to 0.8 MPa. After 6 hours of reaction time a polymer dispersion was obtained having a solid content of approximately 20 wt. %, the particle size being between 80 and 120 nm. The MA had been completely converted to imide. The Tg of the polymer after completion of the imidization was found to be between 190 and 200° C. The dispersion had a pH of 7.0. The contact angle of the dispersion when applied to paper was found to be smaller than 40°.

Example 3

245 g ground SMA and water were charged into a double walled, oil heated reactor of 1 l, which contained a stirrer, to which 0.2 g of Surfinol 420 of Air Products was added. The SMA had a MA content of 26 mole % and a molecular weight of 80000 g/mole. To this solution a 25% NH$_3$ solution was added, so that the MA:NH$_3$ ratio was 1:1. Furthermore, a potassium salt of a SMA polymer was added having a molecular weight of 1000 g/mole and a MA content of 48 mole %. The K salt:SMA ratio was 0.03:1. Water was added until a total volume of 700 ml was obtained. Following increasing the temperature to 160° C., at a rotation speed of 800 rpm, the pressure raised to 0.6 MPa. After 6 hours of reaction time a polymer dispersion was obtained having a solid content of approximately 35 wt. %, the particle size being between 80 and 120 nm. The MA had been completely converted to imide. The Tg of the polymer after completion of the imidization was found to be between 190 and 200° C. The dispersion had a pH of 6.9. Upon drying of the coating no film formation was observed. The contact angle of the dispersion when applied to paper was found to be smaller than 40°.

Example 4

An experiment was carried out on pilot scale, by dissolving 60 kg of ground SMA type Stapron 28110 (DSM, The Netherlands) in 99 kg of water in a pilot reactor at room temperature, to which 0.02 kg of Surfinol 420 of Air Products was added. The SMA had a MA content of 28 mole % and a molecular weight of 110000 g/mole. To this solution 11.70 kg of a 25% NH$_3$ solution in water was added, so that the MA:NH$_3$ ratio was 1:1. When admitting the NH$_3$ solution, the temperature was increased to approximately 78° C. The reactor was further heated until the reaction mixture had a temperature of approximately 155° C. In the course of the reaction, the reaction mixture was stirred using a motor of 35 kW with a reduction of 56 rpm. The electric power needed to drive the stirrer was recorded as a function of time. The results are summarised in Table 1. It was observed that as soon as the reaction mixture obtained a temperature of approximately 134° C., the viscosity increased significantly and a first gel was formed, indicating that the imidization reaction was started by formation of the amide compounds. When continuing the reaction, the reaction mixture became viscoelastic, indicating the formation of the imide was taking place. Formation of SMI particles was observed after a reaction time of approximately 210 minutes, at the moment a significant decreasing viscosity was observed. It was further observed that as soon the pH of the reaction mixture obtained a value of approximately 7, the imidization was complete. After a reaction time of approximately 4 h and 15 min, heating was stopped and the reaction mixture was cooled down to room temperature. A dispersion of SMI in water was obtained having a solids content of 40 wt. %, a pH of 7, a mean particle diameter of 86 nm.

TABLE 1

| Reaction time (min) | Reaction temperature (° C.) | Electric power (Ampère) | Rpm | Pressure (bar) | Observations |
|---|---|---|---|---|---|
| 0 | 23 | 2 | 25 | 0.50 | Introduction of water and Stapron |
| 15 | 78 | 4 | 35 | 0.50 | Introduction of NH₃ solution-closing reactor |
| 30 | 134 | 25 | 37 | 0.70 | Increasing viscosity, vortex decrease |
| 45 | 140 | 30 | 46 | 1.00 | Idem |
| 60 | 143 | 40 | 50 | 1.10 | No vortex-high viscosity |
| 75 | 150 | 50 | 50 | 1.15 | Idem |
| 90 | 154 | 50 | 50 | 1.15 | Increase visco elasticity |
| 105 | 158 | 55 | 50 | 1.80 | Idem |
| 120 | 157 | 58 | 50 | 2.00 | High gloss-jelly aspect |
| 135 | 156 | 63 | 50 | 2.00 | Maximum shear resistance |
| 150 | 155 | 63 | 50 | 2.70 | Maximum shear resistance |
| 165 | 155 | 54 | 50 | 3.00 | Decreasing viscosity |
| 180 | 155 | 48 | 50 | 3.30 | Idem |
| 195 | 155 | 38 | 50 | 3.40 | Vortex coming back |
| 210 | 155 | 29 | 25 | 3.40 | Pressure increased 1 bar manually |
| 225 | 155 | 18 | 20 | 3.50 | Stop heating-start cooling |
| 240 | 100 | 2 | 20 | 3.70 | Less foam-viscosity like water |
| 255 | 45 | 2 | 15 | 3.80 | Dispersion-end of process |

Example 5

The procedure of Example 4 was repeated, this time dissolving 1400 kg of ground SMA type Stapron 26080 (DSM, The Netherlands) in 2352 kg of water in a pilot reactor at room temperature, to which 0.05 kg of Surfinol 420 of Air Products was added. The SMA had a MA content of 26 mole % and a molecular weight of 80000 g/mole. To this solution 249 kg of a 25% NH₃ solution in water was added, so that the MA:NH₃ ratio was 1:1. When admitting the NH₃ solution, the temperature was increased to approximately 86° C. The reactor was further heated until the reaction mixture had a temperature of approximately 150° C. The electric power needed to drive the stirrer stirring the reaction mixture was recorded as a function of time. The results are summarised in Table 2. It was observed that as soon as the reaction mixture obtained a temperature of approximately 101° C., the viscosity increased significantly and a first gel was formed, indicating that the imidization reaction was started by formation of the amide compounds. When continuing the reaction, the reaction mixture became visco-elastic, indicating the formation of the imide was taking place. Formation of SMI particles was observed after a reaction time of approximately 5 hours, at that moment a decreasing viscosity was observed. It was further observed that as soon the pH of the reaction mixture obtained a value of approximately 7, the imidization was complete. After a reaction time of approximately 6 h and 45 min, heating was stopped and the reaction mixture was cooled down to room temperature. A dispersion of SMI in water was obtained having a solids content of 40 wt. %, a pH of 7, a mean particle diameter of 72 nm.

TABLE 2

| Reaction Time (min) | Reaction temperature (° C.) | Electric power (Ampère) | Rpm | Pressure (bar) | Observations |
|---|---|---|---|---|---|
| 0 | 23 | 2 | 50 | 0.50 | Introduction of H₂O |
| 15 | 75 | 4 | 35 | 0.50 | Introduction of Stapron 26080* |
| 60 | 86 | 7 | 37 | 0.70 | Introduction of 25% NH₃ |
| 75 | 101 | 10 | 46 | 1.00 | Start of increase of viscosity |
| 90 | 108 | 15 | 50 | 1.10 | Strong viscosity increase |
| 105 | 114 | 15 | 50 | 1.15 | Idem |
| 120 | 116 | 15 | 50 | 1.15 | Idem |
| 135 | 118 | 17 | 50 | 1.80 | Idem |
| 150 | 122 | 17 | 50 | 2.00 | Idem |
| 165 | 124 | 17 | 50 | 2.00 | Increase of visco elasticity |
| 180 | 127 | 22 | 50 | 2.70 | Decrease of vortex |
| 195 | 131 | 22 | 50 | 3.00 | High gloss and jelly aspect |
| 210 | 135 | 22 | 50 | 3.30 | Slow movement of gel phase in the reactor |
| 225 | 137 | 24 | 50 | 3.40 | No vortex |
| 240 | 138 | 24 | 50 | 3.40 | No vortex |
| 255 | 140 | 24 | 50 | 3.50 | No vortex |
| 270 | 141 | 35 | 50 | 3.70 | No vortex |
| 285 | 142 | 35 | 50 | 3.80 | Forming of chewing gum bubbles |
| 300 | 144 | 35 | 50 | 3.80 | Idem |
| 315 | 145 | 38 | 50 | 3.80 | Idem |
| 330 | 146 | 39 | 50 | 3.80 | Idem |
| 345 | 147 | 40 | 50 | 3.80 | Idem |
| 360 | 149 | 42 | 50 | 4.00 | Very high shear resistance |
| 375 | 150 | 43 | 50 | 5.00 | Maximum sheer resistance |
| 390 | 150 | 43 | 50 | 5.00 | Maximum sheer resistance |
| 405 | 149 | 43 | 50 | 5.00 | Maximum sheer resistance |
| 420 | 149 | 40 | 50 | 5.00 | Viscosity decrease |
| 435 | 150 | 39 | 50 | 5.00 | Viscosity decrease |
| 450 | 150 | 36 | 50 | 5.00 | Light foam and vortex forming |
| 465 | 153 | 32 | 25 | 5.00 | Strong foam forming |
| 480 | 154 | 22 | 25 | 6.00 | Manuel addition of +1 bar pressure |
| 495 | 154 | 12 | 25 | 6.00 | Decrease of foam forming till 6 bar |
| 510 | 155 | 8 | 25 | 6.00 | Low viscosity and minimum foam |
| 525 | 155 | 7 | 25 | 6.00 | Stop the heating and start cooling |
| 540 | 100 | 5 | 25 | 6.00 | Less foam and viscosity like water |
| 555 | 40 | 2 | 25 | 6.00 | Dispersion-end of process |

Example 6

The experiment of Example 1 was repeated using SMA type 2000 (from Atofina, France). The resulting dispersion had a solid content of approximately 20 wt % and a pH of 7.1. The particle size was 1500 nm.

Example 7

Approximately 3 kg of the product obtained from Example 5 was subjected to ultrafiltration using a Valmet Flootek CR 200/1 with a 30000 Dalton cut-off. The final stable dispersion had a 58.6% solid content.

Example 8

Wood free paper with dry weight of 67 g/m² was coated with an on-line film press at a speed of 1300 m/min with base coating of 5 g/m² on both paper sides calculated as dry matter. The applied coating had a solid content of 60 wt. % and contained 100 parts calcium carbonate, 8 parts latex and 8 parts starch. On top of the base coating, an mid coating of 13 g/m² calculated as dry matter was applied off-line on both paper sides having the same composition as the base coating, however with a solids content of 64 wt. %.

The thus pretreated paper was coated on both sides with a top coating of 6 g/m² calculated as dry matter. The top coating had the following composition: 75 parts of $CaCO_3$, 25 parts of kaolin, 14 parts of latex, the usual additives and 10 parts of the polymer dispersion of this invention, the properties of which are given in Table 3 below.

The paper was passed through a calendar having 9 successive nip passages, at a nip pressure of 220 N/m.

The thus obtained paper had a total dry weight of 115 g/m².

Comparative Example

The experiment of Example 8 was repeated, however this time using as a top coat a reference coating containing 75 parts of $CaCO_3$, 25 parts of kaolin, 14 parts of latex and the usual additives. The reference coating did not contain the polymer dispersion of this invention. Thereafter the paper was passed through a calendar having 11 successive nip passages, at a pressure of 280N/m at each nip.

The thus obtained paper had also a total dry weight of 115 g/m² as the dry weight of the base paper and the amount of coatings was the same as in Example 8.

TABLE 3

| Dispersion[1] | Particle size (nm) | Paper gloss |
|---|---|---|
| 26080 | 80 | 77 |
| 28110 | 95 | 75 |
| 33003 | 1500 | 57 |
| 34080 | 150 | 73 |
| Comp. Ex. |  | 75 |

[1] SMA notation, first two numbers denote the MA content, last three numbers Mw × 10⁻³.

From the comparison of the results of Example 8 with the Comparative example it becomes clear that with the polymer dispersion of this invention a similar gloss can be obtained although both the number of calendar nips and the nip pressure used is lower.

It was further observed that the paper obtained according to this invention was thicker and had higher Scott Bond values as compared to the paper obtained with the Comparative example. This is attributed to the fact that with the invention the number of nips required in the calendaring process may be reduced as well as the nip pressure, as a consequence of which the paper strength is less affected during calendaring and a high initial gloss may be obtained.

The invention claimed is:

1. An aqueous polymer dispersion comprising a copolymer of maleic anhydride monomer units and styrene monomer units, which copolymer has been subjected to an imidization reaction with $NH_3$ or an amine $RNH_2$ (wherein R is an alkyl group having 1-18 carbon atoms or an aryl group), wherein the molar ratio between $NH_3$ or the amine and the maleic anhydride monomer in the copolymer ranges between 1.2-0.8:1, wherein at least 95 mole % of the anhydride monomer units of the copolymer are imidized, and wherein the polymer dispersion comprises discrete particles having a particle size between approximately 30-400 nm.

2. The aqueous dispersion as claimed in claim 1, wherein the maleic anhydride monomer content of the copolymer ranges between 5-50 mole % and the styrene monomer content of the copolymer ranges between 95-50 mole %.

3. The aqueous dispersion as claimed in claim 1, wherein the copolymer has a molecular weight ranging between 60,000 to 200,000 g/mole.

4. The aqueous dispersion as claimed in claim 1, wherein the dispersion has a solid content of more than 20 wt. %.

5. An aqueous coating composition for coating a product to be imprinted, wherein the coating composition contains a polymer dispersion as claimed in claim 1.

6. The aqueous coating composition according to claim 5, further containing binders, conventional pigments and, optionally, additives.

7. A method of coating a surface to be imprinted comprising applying to said surface a polymer dispersion according to claim 1.

8. The method according to claim 7, wherein the surface is selected from the group consisting of paper, paperboard, cardboard, organic film, metal and textile.

9. The aqueous dispersion as claimed in claim 1, wherein the maleic anhydride monomer content of the copolymer ranges between 22-35 mole % and the styrene monomer content of the copolymer ranges between 65-78 mole %.

10. A method for the production of an aqueous polymer dispersion comprising reacting a starting copolymer of maleic anhydride monomer units and styrene monomer units in an aqueous solution of $NH_3$ or an amine $RNH_2$ (wherein R is an alkyl group having 1-18 carbon atoms or an aryl group), wherein the molar ratio between $NH_3$ or the amine and the maleic anhydride monomer in the copolymer ranges between 1.2-0.8:1, and wherein at least 95 mol % of the anhydride monomer units are imidized, and wherein the polymer dispersion comprises discrete particles having a particle size between approximately 30-400 nm.

11. The method as claimed in claim 10, wherein the copolymer has a molecular weight ranging between 60,000 to 200,000 g/mole.

12. The method according to claim 10, further comprising subjecting the thus obtained mixture to an imidization reaction in the presence of an alkali salt of an acid functional polymer containing acid functional monomer units and vinyl aromatic monomer units.

13. The method as claimed in claim 12, wherein in the course of the imidization reaction, the reaction mixture is stirred so as to minimize adhesion of the reaction mixture to the reactor wall.

14. The method as claimed in claim 12, wherein the imidization reaction is carried out at a temperature above 100° C.

* * * * *